(12) United States Patent
Bhalerao et al.

(10) Patent No.: US 9,516,061 B2
(45) Date of Patent: *Dec. 6, 2016

(54) SMART VIRTUAL PRIVATE NETWORK

(71) Applicant: Cisco Technology, Inc., San Jose, CA (US)

(72) Inventors: Pranav Bhalerao, Bangalore (IN); Sunil Nr, Bangalore (IN); Chandra Balaji, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/090,378

(22) Filed: Nov. 26, 2013

(65) Prior Publication Data

US 2015/0150073 A1 May 28, 2015

(51) Int. Cl.
*H04L 29/06* (2006.01)

(52) U.S. Cl.
CPC .......... *H04L 63/20* (2013.01); *H04L 63/0272* (2013.01); *H04L 63/105* (2013.01); *H04L 63/205* (2013.01)

(58) Field of Classification Search
CPC .... H04L 63/20; H04L 63/205; H04L 63/0272; H04L 45/00; H04L 45/02; H04L 63/061; H04L 63/164; H04L 63/105
USPC ......... 726/1, 12–15; 709/227–229, 238, 220, 709/221; 713/151–154
See application file for complete search history.

(56) References Cited

U.S. PATENT DOCUMENTS

| | | | |
|---|---|---|---|
| 5,809,233 A | | 9/1998 | Shur |
| 6,823,462 B1 * | | 11/2004 | Cheng et al. .................. 726/15 |
| 7,028,092 B2 | | 4/2006 | MeLampy et al. |
| 7,409,709 B2 | | 8/2008 | Smith et al. |
| 7,421,483 B1 | | 9/2008 | Kalra |
| 7,447,901 B1 * | | 11/2008 | Sullenberger ....... H04L 63/0272 713/153 |
| 7,478,427 B2 * | | 1/2009 | Mukherjee .......... H04L 12/4633 709/228 |
| 7,558,877 B1 * | | 7/2009 | Fedyk .................... H04L 63/20 709/242 |

(Continued)

FOREIGN PATENT DOCUMENTS

EP 2469753 A4 3/2013

OTHER PUBLICATIONS

S. Frankel et al., IP Security (IPsec) and Internet Key Exchange (IKE) Document Roadmap, Feb. 2011, Internet Engineering Task Force.

(Continued)

*Primary Examiner* — Shanto M Abedin

(74) *Attorney, Agent, or Firm* — Lempia Summerfield Katz LLC

(57) ABSTRACT

In one implementation, a policy server establishes a smart virtual private network between two client devices. The smart virtual private network includes a secure communication session using a security level or security algorithm that is variable and defined as a function of the two client devices. A first client device may generate a registration request including a first security configuration including the security level. Based on the registration request, the policy server generates a routing message that defines routing for communication from the first client device to a second client device. The routing message may update a routing table to associate the policy server with the second client device.

15 Claims, 6 Drawing Sheets

(56) References Cited

U.S. PATENT DOCUMENTS

| | | | |
|---|---|---|---|
| 7,602,737 B2 | 10/2009 | Asati et al. | |
| 7,848,335 B1 | 12/2010 | Kang | |
| 8,059,641 B1 | 11/2011 | Rai | |
| 8,341,410 B2 | 12/2012 | Shao et al. | |
| 8,346,961 B2 | 1/2013 | Asati et al. | |
| 8,769,661 B2 | 7/2014 | Wang | |
| 2002/0010866 A1 | 1/2002 | McCullough et al. | |
| 2003/0233576 A1 | 12/2003 | Maufer et al. | |
| 2005/0138204 A1 | 6/2005 | Iyer et al. | |
| 2005/0270972 A1 | 12/2005 | Kodialam et al. | |
| 2006/0013191 A1* | 1/2006 | Kavanagh | H04L 63/102 370/349 |
| 2006/0050653 A1 | 3/2006 | Guichard et al. | |
| 2006/0230182 A1 | 10/2006 | Furukawa et al. | |
| 2007/0115990 A1 | 5/2007 | Asati et al. | |
| 2007/0206597 A1 | 9/2007 | Asati et al. | |
| 2008/0016550 A1* | 1/2008 | McAlister | 726/1 |
| 2008/0080509 A1 | 4/2008 | Khanna et al. | |
| 2008/0307110 A1* | 12/2008 | Wainner et al. | 709/238 |
| 2009/0049524 A1* | 2/2009 | Farrell et al. | 726/4 |
| 2009/0097417 A1 | 4/2009 | Asati et al. | |
| 2009/0157901 A1* | 6/2009 | Asati et al. | 709/238 |
| 2009/0172801 A1 | 7/2009 | Friedrich et al. | |
| 2009/0327695 A1* | 12/2009 | Molsberry | H04L 63/20 713/151 |
| 2010/0037311 A1* | 2/2010 | He | H04L 63/20 726/15 |
| 2010/0085977 A1 | 4/2010 | Khalid et al. | |
| 2010/0146582 A1* | 6/2010 | Jaber et al. | 726/1 |
| 2010/0235620 A1* | 9/2010 | Nylander | H04L 63/20 713/151 |
| 2011/0023090 A1 | 1/2011 | Asati et al. | |
| 2011/0289134 A1* | 11/2011 | de los Reyes | H04L 63/20 709/203 |
| 2012/0250516 A1 | 10/2012 | Aggarwal et al. | |
| 2013/0058345 A1 | 3/2013 | Kano | |

OTHER PUBLICATIONS

International Search Report and Written Opinion from PCT/US2014/066288, Feb. 23, 2015, WO.

Keromytis et al., IPsec Policy Discovery Architecture, Oct. 1, 1999, draft-keromytis-ipsp-arch-00.txt.

Zao et al., Domain Based Internet Security Policy Management, Jan. 25, 2000, pp. 41-53, vol. 1, DARPA Information Survivability Conference and Exposition, 2000.

Cisco, "Dynamic Multipoint VPN (DMVPN) Design Guide," Jul. 10, 2008, Cisco, Version 1.1, p. 26.

Cisco, Migrating from Dynamic Multipoint VPN Phrase 2 to Phrase 3: Why and How to Migrate to the Next, Phase, 2006, Cisco, p. 1-16.

Luciani et al., "NBMA Next Hop Resolution Protocol (NHRP)," Apr. 1998, The Internet Society, p. 1, 16, and 43.

* cited by examiner

SMART VIRTUAL PRIVATE NETWORK

TECHNICAL FIELD

This disclosure relates in general to the field of secure communication between client devices.

BACKGROUND

Internet protocol security (IPsec) is an example of a security protocol for securing network communications by authenticating and/or encrypting each data packet. Mutual authentication is established between a network of two or more computing system endpoints at the beginning of a communication session. However, in conventional IPsec and other similar security protocols, routers are statically configured for the secure communications for a single security level.

In an example network, a hub is a centrally located network device and spoke network devices connected to the hub. A spoke may be a branch router or an edge router. Spokes located in different geographies are connected to the same hub. In hub and spoke network, all spokes use the same hashing and encryption algorithms.

In these examples of security protocols, hub and spoke networks, and other scenarios, individual devices are forced to use the common security level rather that the optimal security level for the individual devices.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
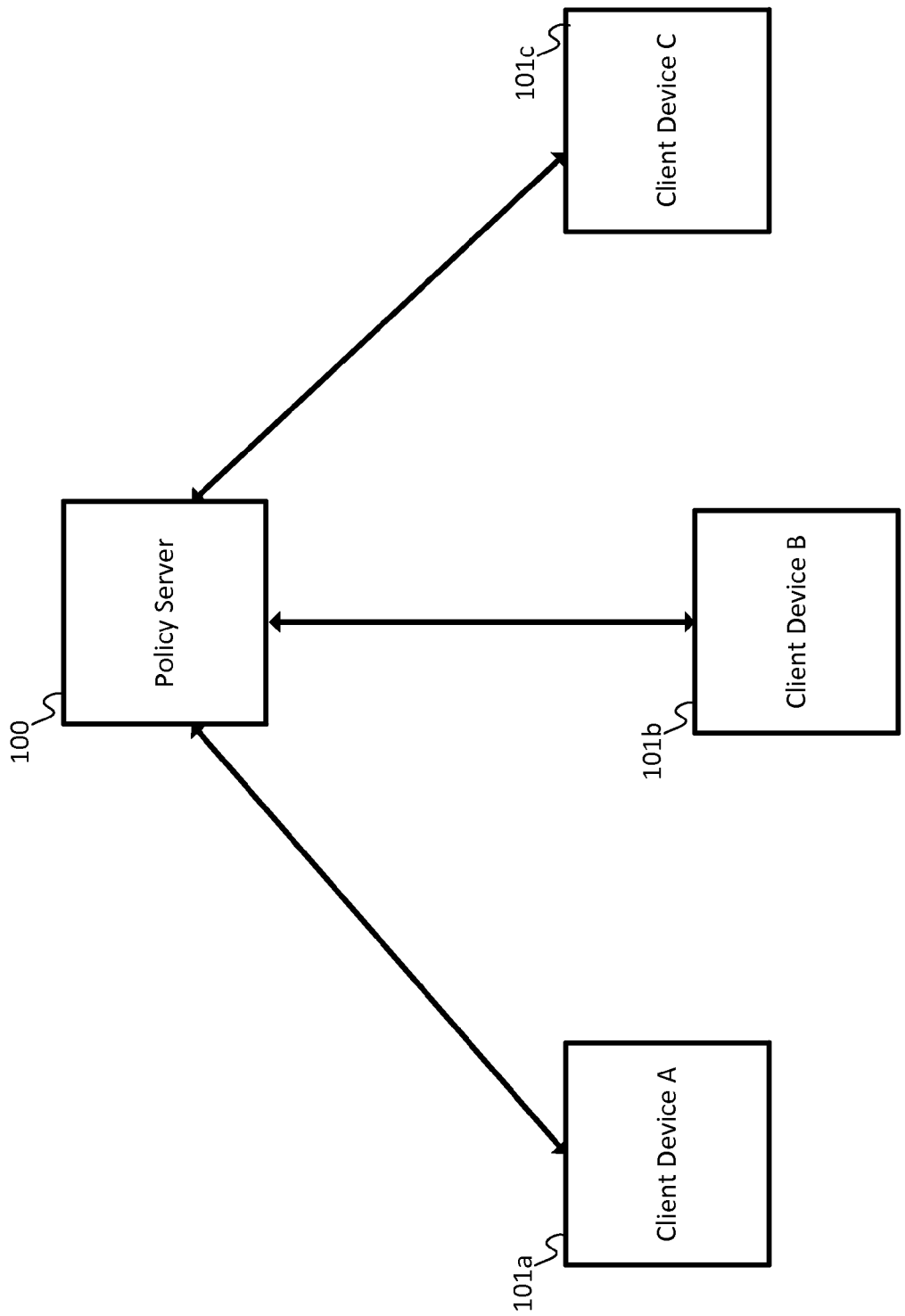
FIG. 1 illustrates an example smart virtual private network.

In one embodiment, a security protocol channel is established between a policy server and a first client device. A registration request including a first security configuration for the first client device is received. The first security configuration includes a security level. A client database is updated according to the security configuration. A routing message, which defines routing for communication from the first client device to a second client device, is generated for the first client device.

In another embodiment, a security protocol channel with a policy server is established. A registration request including a first security configuration for the first client device and including a security level is sent to the policy server. A routing message is received from the policy server. The routing message defines routing for communication from the first client device to a second client device. A routing table is updated in response to the routing message.

Example Embodiments

In hub and spoke networks, virtual private networks (VPN) involving any of the spoke devices terminate at the hub device. All communication is routed through the hub device, and all spoke devices use the same hashing and encryption algorithms for all communication. In hub and spoke networks, the hub device may resolve a non-broadcast multiple access (NBMA) address for communication with a network behind a spoke device. However, the hub and spoke model does not permit policies to be pushed to the spoke devices or dynamic selection of a policy.

Group encrypted transport virtual private networks (GET-VPNs) solve various scalability and manageability issues of partially or fully meshed VPNs. However, GETVPNs do not hide endpoint identities, which may allow unauthorized entities to discover with whom the information is communicated. In addition, members in the GETVPN must use the same cryptographic algorithm. No flexibility is provided in choosing different security algorithms and/or hash algorithms for different group members. In some circumstances, the highest possible security level should be used. However, in other circumstances lower security levels may provide sufficient protection without wasting bandwidth, CPU cycles, or other resources. In addition, GETVPN may require a private wide area network (WAN), such as multi-protocol label switching (MPLS), to communication, which is additional overhead that may consume resources.

The following embodiments provide secure point-to-point communication through a virtual private network with varying levels of security. The level of security is selected based on the capabilities of the endpoints, preferences of the endpoints, or the type of communication. A virtual private network is established using a client and server model. Client registers with Policy Server to update its host networks and the level of security, which is required. When a data packet arrives at an originating client destined for a remote client, the originating client requests a policy from the policy server. After receiving the policy from Policy Server, the originating client establishes direct secure communication with destination client.

Figure 2:
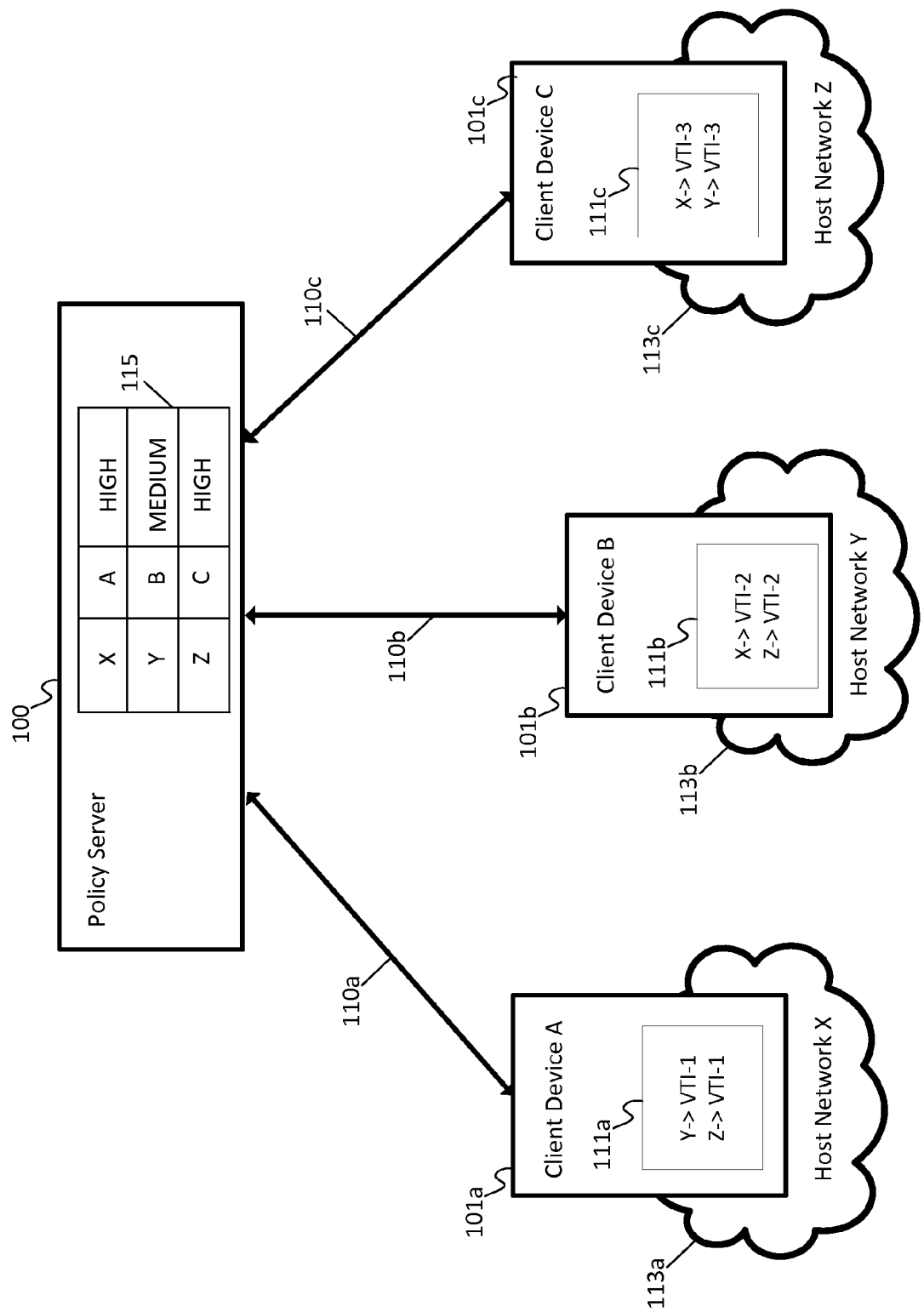
FIG. 2 illustrates another example smart virtual private network.

FIG. 2 illustrates an example system for providing smart virtual private networks configured with dynamic security levels. The system includes at least a policy server 100 and two client devices. For example, a smart VPN may be established between any of the client devices 101a-c.

Initially, a security channel between the policy server 100 and one of the client devices (e.g., client device 101a) is established. The security channel may be established using IPsec security protocol. Internet protocol security (IPsec) is a security protocol that operates on the Internet layer of the Internet protocol suite. The security protocol may specify five stages including tunnel initiation, Internet key exchange (IKE), IPSec Session establishment, data transfer, and tunnel termination.

In a registration phase, the client device 101a is configured to generate a registration request and send the registration request, via the security channel, to the policy server 100. The policy server 100 receives the registration request which may contains the client's host network summary and the preferred security level for each host network. The Policy Server decides the choice of encryption, hash & DH algorithms for different levels of security, which can be configured at Policy Server as shown in Table 1.

TABLE 1

| Security Level | Encryption Algorithm | Hashing Algorithm | DH Group |
|---|---|---|---|
| HIGH | AES-128/256/512 3DES | SHA2 SHA1 | Group 16, 21, 24 |
| MEDIUM | 3DES DES | SHA1 MD5 | Group 4, 12, 16 |
| LOW | DES | MD5 | Group 1, 2, 4 |

The policy server 100 is configured to update a client database according to the client's host network and its respective security level. The client devices may be listed by IP address, a media access control (MAC) address, or another identification value. The security levels may be selected by the client during registration depends on the type of communication. For example, the high security level may be used for banking or other transactions, the medium level may be used for file server transfers, and the low level may be used for public web traffic or messaging.

The policy server 100 generates an acknowledgement message for the client device 101a, which may contain the host network information of other registered clients 101b-c. This will allow the client device 101a to communicate with other client's 101b-c host networks. For example, the registration acknowledgement message may specify the address of the policy server 100 as the next hop address for client device 101b and/or client device 101c host networks. The client device 101a receives the registration acknowledgement message and updates its routing table with Policy server as next hop address for client device 101b and/or client device 101c host networks. The registration phase is complete.

In the policy request phase, a client device requests the policy server 100 to establish direct communication with another client device. For example, a policy request from client device 101a may specify its intent to establish a direct communication with client device 101b. The policy server 100 queries the client database for the security configuration for the client device 101b. The security configuration may specify individual algorithms or a generalized security level.

In one example, the policy server 100 queries the client database for the security configuration for the client devices 101b and 101a. The policy server 100 may determine the greatest common security algorithms between two clients for encryption, hashing and Diffie-Hellman, based on the security levels registered by clients during registration phase.

Using the selected security algorithms for communication, the policy server 100 generates a policy (e.g., IPsec policy). The policy may specify one or more encryption algorithms, hashing algorithms, or DH algorithms. The policy may include the secure endpoint address of the remote client device 100b. The policy may also include an access control list (ACL), such as a crypto ACL which contains the information about traffic selectors i.e., source and destination of the traffic. For example, here the host network behind client 101-a can be the source and host network behind client 101-b can be the destination. Based on the policy a direct communication session is established between the client device 101a and the client device 101b.

FIG. 2 illustrates another example smart virtual private network. In addition to the policy server 100 and the client devices 101a-c, FIG. 2 illustrates host networks 113a-c, routing tables 111a-c specifying communication paths 110a-c, and a client database 115.

Each, any, or all of the client devices 101a-c may correspond to a host network (e.g., networks 113a-c). The network is a host network or a protected network that is located behind the client device. The network may include multiple servers, endpoints, or other network devices. However, all communication to any of the network devices in networks 113a-c must be routed through the respective client device 101a-c.

The client database 115 may list identifying information and security information for each of the networks 113a-c. For example, an entry in the client database 115 may associate host network X, which is behind client device A, with a security level of high. X and A may be host network & secure end point addresses respectively, names, or other identification values. Similarly, an entry in the client database 115 may associate network Y with client device B and a medium security level, and another entry in the client database 115 may associate network Z with client device C and a high security level.

The client database 115 may also associate each of the networks or client devices with a group identification. The client device may be classified according to the group identification. The group identification may classify or organize client devices of the same enterprise or entity. Therefore, the client database 115 may organize multiple groups of client devices using the group identifier. Communication may not be permitted between client devices have different group identifiers.

The communication paths 110a-c may be tunnels. In one example, the communication paths 110a-c may be specified according to a virtual tunnel interface (VTI). The communication paths may utilize multiple forms of encapsulation. For example, communications may be encapsulated with generic routing encapsulation (GRE) and IPsec encapsulation on top of the GRE. The routing tables 111a-c may associate one or more virtual tunnel interfaces with destination networks.

Figure 3:
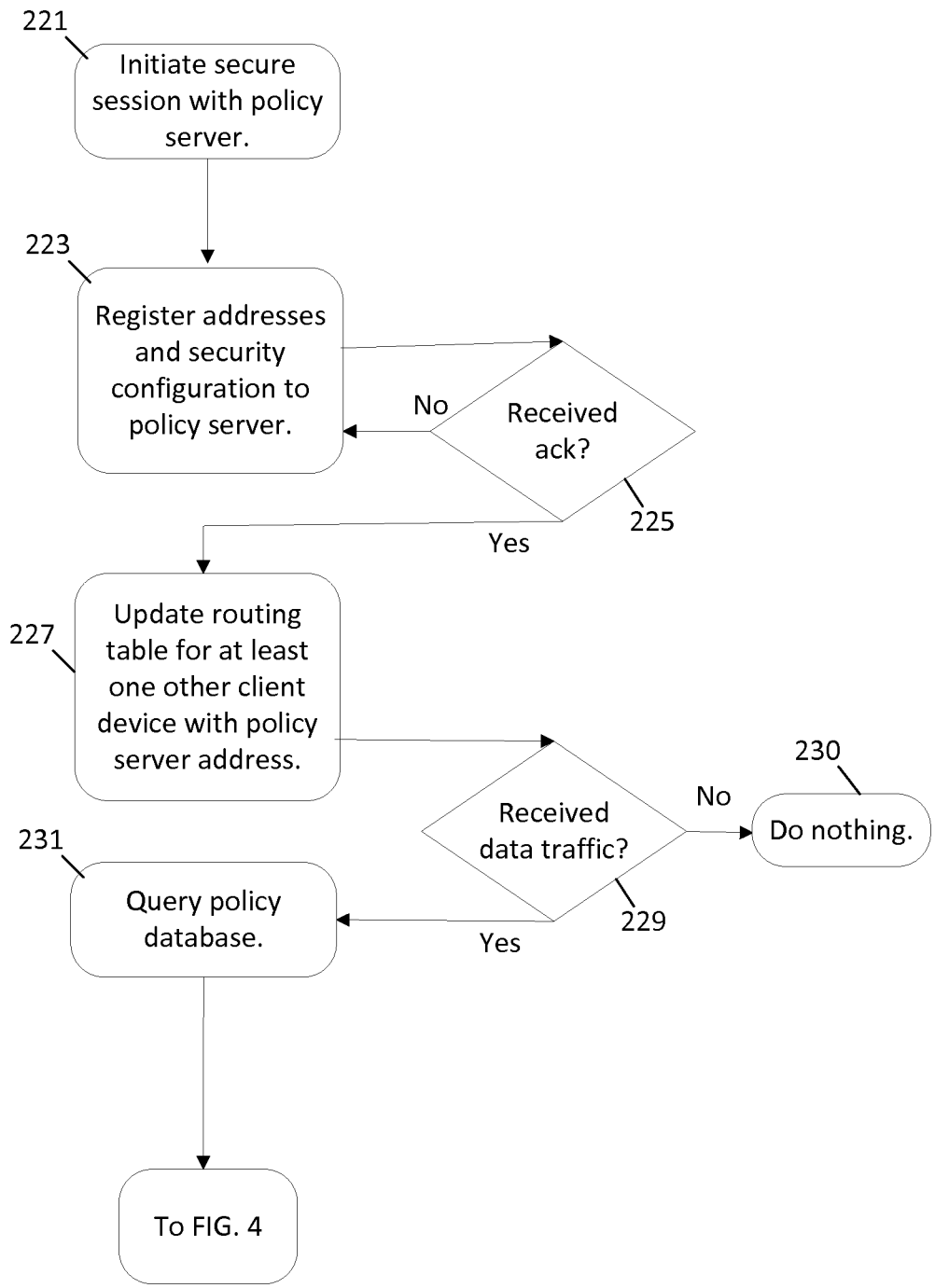
FIGS. 3 and 4 illustrate an example flowchart for a client network device of FIG. 1 or 2.
Figure 4:
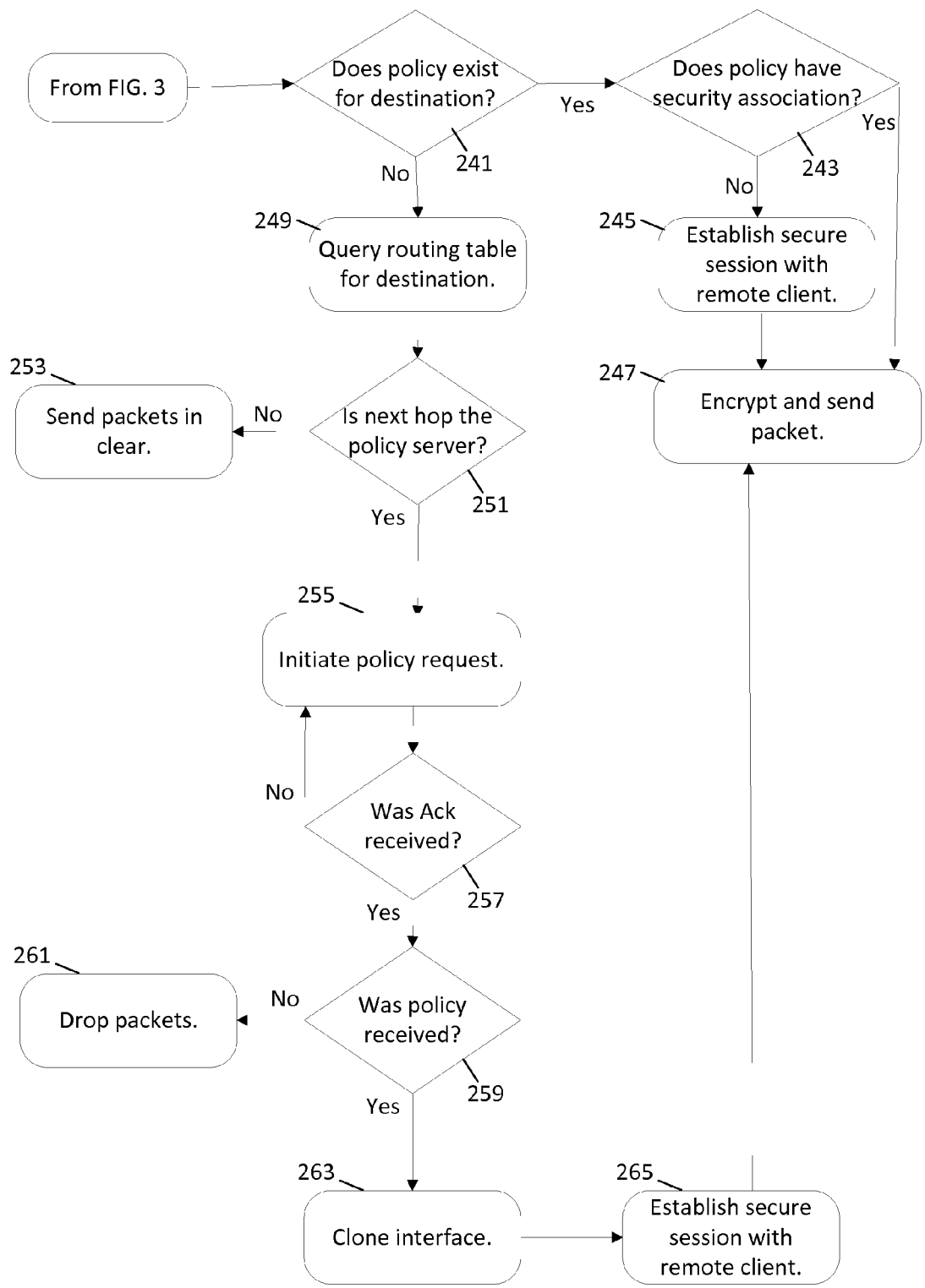

FIGS. 3 and 4 illustrate an example flowchart for a client network device of FIG. 1 or 2. Additional, fewer, or different blocks in the flowchart may be included. At 221, a security session or secure channel is initiated between the policy server 100 and a client device (e.g., client device 101a). The security session may be specific to a client-server pair. The security session may be an IPSec session and include a key exchange (e.g., IKE).

At 223, the client device registers its secure-end point address, its host network summary and preferred security level to the policy server. For example, the client device generates a registration request and encapsulates the registration request in a user datagram protocol (UDP) packet through the security session or secure channel to the policy server 100. The UDP packet may include a header with four fields, including source port number, destination port number, length, and checksum.

The addresses may include an IP address for the network device 101a. The addresses may include a wide area network (WAN) address for the client device 101a and a local area network (LAN) or host network address for the protected network behind the client device 101a. The addresses may include addresses or an address range for endpoints connected to the protected network.

The security configuration at policy server may include generalized security levels as described in Table 1. Any number of levels is possible. The security algorithms for different security levels may be configurable at the policy server 100. For Example, security algorithms include advanced encryption standard (AES), data encryption standard (DES), secure hash algorithm (SHA), message digest algorithm 5 (MD5), or other algorithms.

In response to receiving the registration, the policy server 100 generates an acknowledgement message and sends the acknowledgement message back to the client device in response to the registration request. The client device, at 225, determines whether the acknowledgement is received during a predetermined timeout period. Example timeout periods may be 5 seconds, 100 seconds, or another value. If the timeout period passes without receiving an acknowledgement message, the client device may attempt another registration by sending the addresses and preferred security level to the policy server 100 again. The client device may repeat the registration a configurable number of times and report an error with the policy server 100 if registration continues to be unsuccessful.

At 227, the client device may update its routing table for at least one other client device's host network with the address of the policy server 100 as next-hop. Information for updating the routing table may be included in the acknowledgement message. In one example, the acknowledgement message includes a list of the other registered client devices & their respective host networks. The routing table for the recently registered client device is updated so that the address of the policy server 100 is listed as the next hop address for each of the other registered client device's host networks.

At 229, the client device looks for data traffic. The data traffic includes one or more data packets including a destination address. The client device determines whether data traffic has been received that is destined for one of the other client devices. If not, the client the device does nothing, as shown by block 230.

At 231, if data traffic, or the specified data traffic, is received, the client device queries a policy database. The policy database may be an IPsec database. The policy database may list security policies associated with the other client devices that have already been established with a security policy.

At 241, which is shown in FIG. 4, the client device determines whether the destination address, or at least the first prefix of the destination address, is associated in the policy database with a security policy. If such an association does exist, the client device further checks whether the destination address also has a security association (e.g., an IPsec SA), as shown by 243. If a security association exists, the client device encrypts and sends the one or more packets to the destination, as shown by 247. At 245, when no security association exists, the client device establishes a secure session with the other client device (e.g., remote client). The secure session may involve triggering IKE and IPsec.

At 249, when the client device determines that no security policy exists in the policy database for the destination, the client device queries the routing table for the next hop address associated with the destination address.

At 251, the client device determines whether the next hop address is the address of the policy server. If not, the data packet will be sent in clear text without any security algorithms applied. as shown by 253.

If the next hop address is the address of the policy server 100, the client device initiates a policy request at 255 and sends the policy request to the policy server 100. The policy request may include a summary, which includes a source IP address and a destination IP address of the one or more packets received at the client device. The destination IP address may be the same as the destination network address extracted from the data traffic. In addition, in response to the address of the policy server being listed as the next hop address, If there is no response for the policy request sent by the client, client may start dropping the data packets until the IPsec policy is received from the policy server.

At 257, the client device determines whether an acknowledgement message for the policy request has been received from the policy server 100. If no acknowledgement message was received after a predetermined timeout period, the client device may initiate and send another policy request.

At 259, the client device determines whether a security policy is received from the policy server 100 or not. At 261, the client device drops the data packets when no security policy is received.

At 263, the client device may establish a virtual access interface to apply the security policy. The virtual access interface may be cloned or dynamically created from an existing virtual access interface. Attributes, such as quality of service parameters or a maximum transmission size setting, may be inherited to the cloned virtual access interface from the existing virtual access interface. The client device may modify the routing table using the cloned virtual access interface as the new hop for the destination address.

At 265, the client device establishes a secure session with the other client device. The secure session may involve triggering IKE and IPsec according to the security policy received from Policy Server. At 247, the data traffic is encrypted and sent to the destination address, such as a protected network behind another client device, using the secure session.

Figure 5:
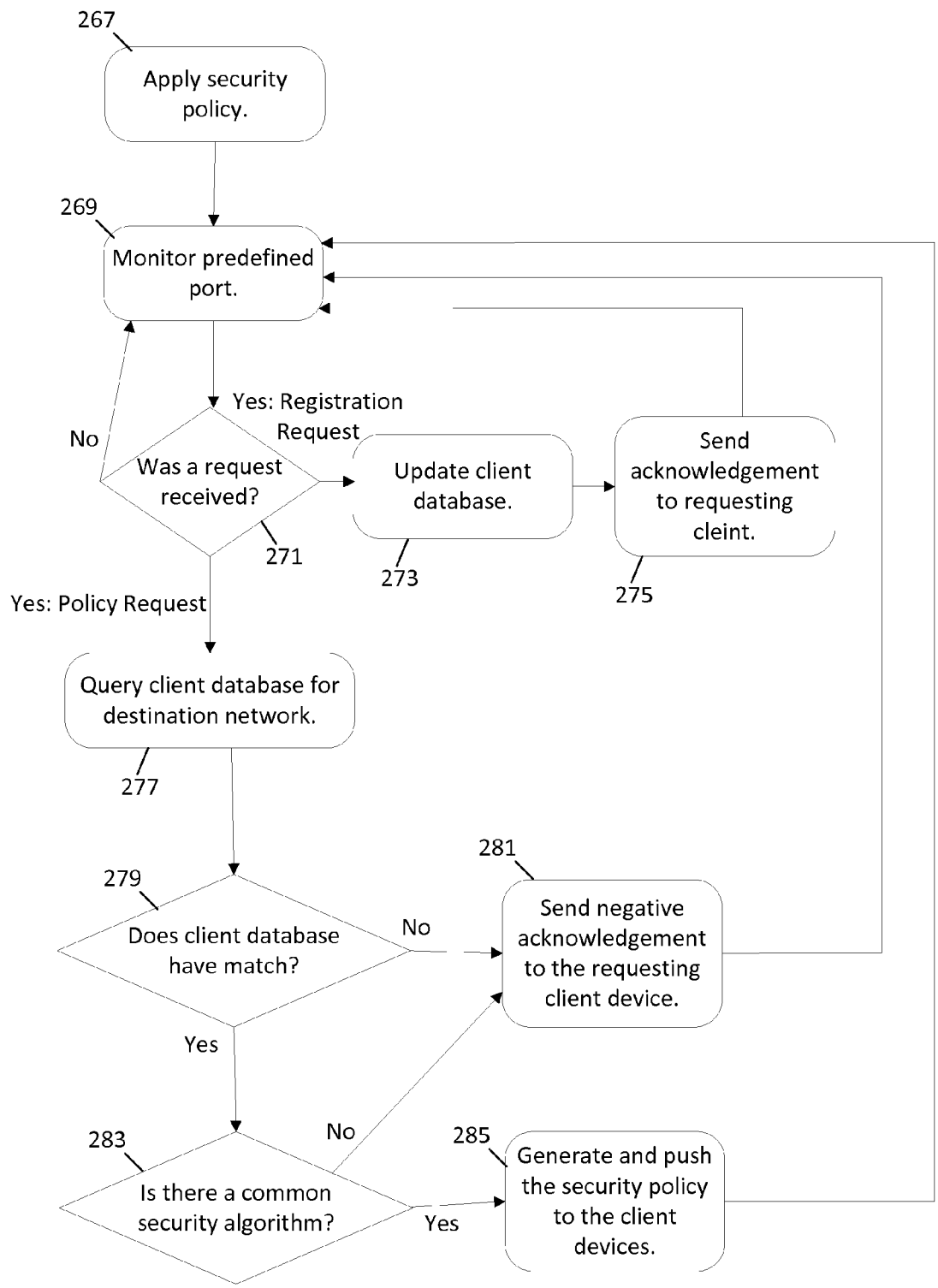
FIG. 5 illustrates an example flowchart for a policy server of FIG. 1 or 2.

FIG. 5 illustrates an example flowchart for the policy server 100 of FIG. 1 or 2. Additional, fewer, or different blocks in the flowchart may be included. At 267, the policy server 100 applies an initial security policy for communication with client devices as given in FIGS. 3 and 4. At 269, the policy server 100 monitors a predefined port. The port may be a UDP port.

At 271, the policy server 100 determines whether a request was received from one of the client device and identifies the type of request. The type of request may be a registration request or a policy request. The request may include a flag that identifies the request as either a registration request or a policy request.

At 273, for registration requests, the policy server 100 is configured to update the client database. Also in response to the registration request, the policy server 100 is configured to generate an acknowledgement message. At 275, the policy server 100 may send the acknowledgement message to the requesting client device in order to indicate to the requesting client device that registration was successful. The policy server 100 may return to monitoring the predefined port.

The acknowledgement message for the requesting client device may include information about the protected networks of other client devices. For example, an acknowledgement message generated for client device 101*a* may include protected address information associated with client device 101*b* and/or client device 101*c*. The requesting client device is configured to add the routes of protected networks pushed by the policy server 100 into its routing table with the next hop address listed as the policy server 100.

At 277, for policy requests, the policy server 100 is configured to query the client database for a destination network address extracted from the policy request. The destination network address is the one, which is originated from the data traffic received at the client device. The client database includes mapping information of each client device's protected network to a respective level of security and a secure-end point address for the protected network.

At 279, the policy server 100 determines whether the client database has a match for the destination network. When no match exists, the policy server 100 may generate a negative acknowledgement message and send the negative acknowledgement message to the requesting client device.

At 283, when a match between the destination network and the client database exists, the policy server 100 further extracts one or more security algorithms based on the security levels associated with the source and destination network. In one example, the policy server 100 determines whether there is a common security algorithm between the requesting client device and the destination network. The common security algorithms may be the highest security level compatible with both the source client device and the destination client device.

At 285, the policy server 100 generates a security policy based on the common security algorithm and sends the security policy to the requesting client device and the destination client device. When the security policy is ready at the policy server 100, the security policy is pushed to the requesting client device and also to the destination client device. The security policy may be defined according to IPsec. An IPsec policy pushed by policy server 100 may contain a transformation set as any combination of an encryption algorithm, a hash algorithm, and a DH algorithm based on the preferred and common security level. The IPsec policy may list a secure endpoint address of the destination client device. The IPsec policy may include an access control list (ACL) that specifies the type of traffic to protect.

After communication ends between the requesting client device and the destination client device using the security policy, the policy server 100 and/or the client devices may delete the security policy. The security policy may be deleted in response to tearing down the communication channel. In one example, the security policy is deleted after a predetermined time passes after the communication channel has been torn down.

The client devices are also configured to merge the IPSec policies, if required. For example, when more than one network is behind a client device, the policies of the two networks are merged into a single policy when the same security level is used for both networks. Instead of creating a new virtual access interface, the client device merges an existing security policy with a newly received policy for the second network. Communications destined for the second network may use the existing communication channel (e.g., IPsec channel) instead of creating a new communication channel with same client device.

Figure 6:
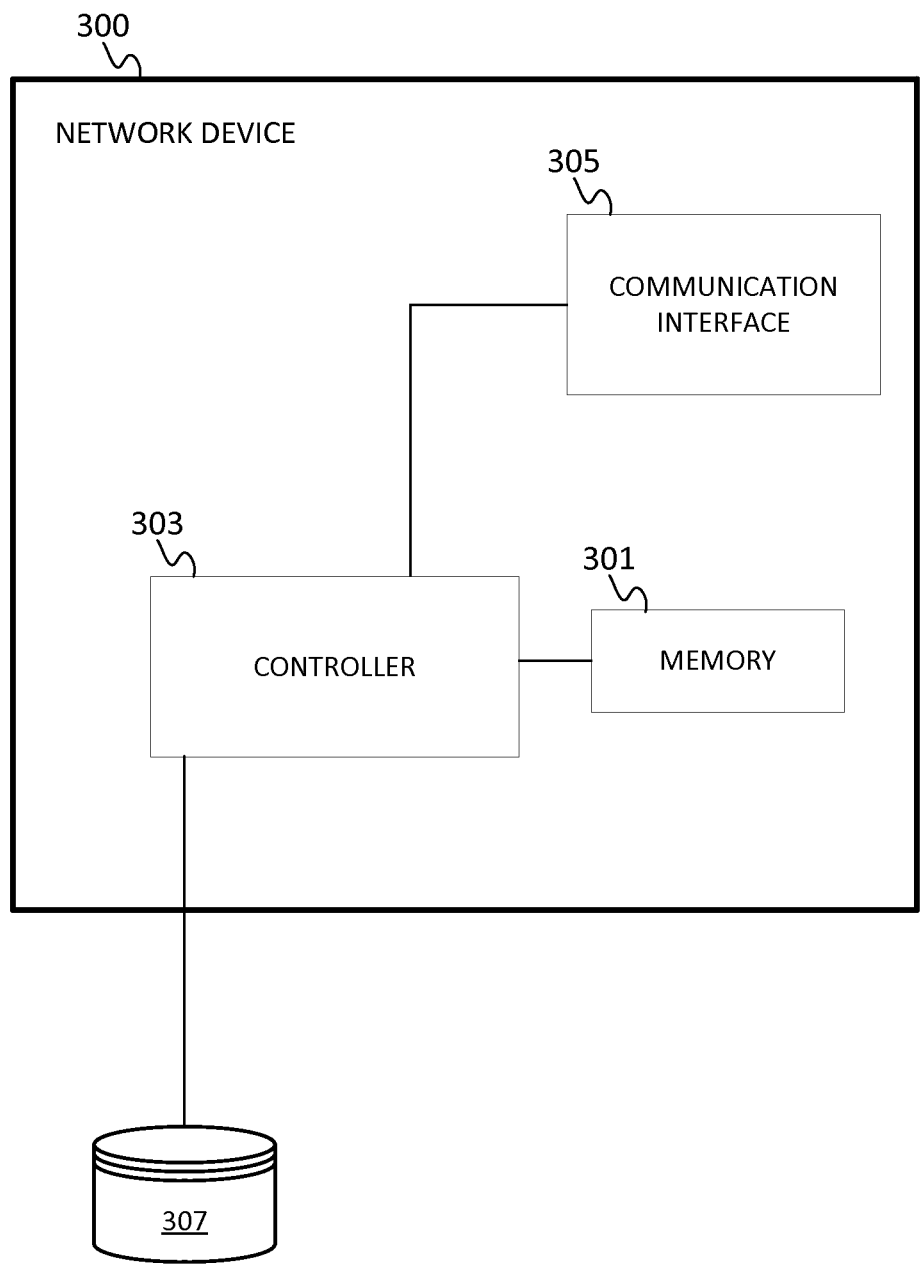
FIG. 6 illustrates an example client network device or an example policy server.

FIG. 6 illustrates an example network device 300 for the networks of FIG. 1 of FIG. 2. The network device 300 includes at least a memory 301, a controller 303, and a communication interface 305. The network device 300 may correspond to the policy server 100 or any one of the client devices 101*a-c*. In one example, a database 307 or the memory 301 stores the client database 115 and in the other example, the database 307 or the memory 301 store the routing table. Additional, different, or fewer components may be provided. Different network devices may have the same or different arrangement of components.

The network device 300 may represent the policy server 100. The database 307 or the memory 301 is a client database configured to store protected network addresses associated with security configurations. Each of the networks listed in the client database may be associated with a client device of an enterprise. The network device 300 facilitates secured communication between client devices or between a client device and one of the protected networks. The network device 300 may establish a virtual private network between client devices.

The communication interface 305 is configured to receive a registration request from one of the client devices. The registration request including a security configuration for the originating client device. The security configuration includes a security level or a security algorithm.

The controller 303 is configured to update the client database according to the security configuration and generate a routing message for the originating client device. The routing message defines routing for communication from the first client device to a second client device. The routing message may designate the policy server 100 as the next hop address for communication from the originating client device to a remote client device.

The communication interface 305 may also receive a policy request from the originating client device. The policy request may specify that data traffic has arrived at the originating client device and destined for the remote client device. The controller 303 is configured to query the client database based on the policy request and generate a security policy based on at least the security configuration stored in the client database. The security policy may be the most secure common security algorithm included in both the entry for the originating client device and the entry for the remote client device.

The network device 300 may represent one of the client device 101*a-c*. The database 307 or the memory 301 is a routing database configured to store destination addresses and next hop addresses.

The controller 303 is configured to generate a registration request including a security level for a local device and configured to update the routing database based on a routing message received from a policy server in response to the registration request. The routing message defines the next hop address for a remote client device as the policy server in the routing database in the network device 300.

When the communication interface 305 subsequently receives a data packet, the controller 303 determines whether the packet should be protected using a secure channel. In one example, a list of IP addresses that require secure communications are stored in the memory 301 and consulted with the source IP address in the new data packet. In another example, a list of protected types of data packets are stored in the memory 301 and consulted based on the data packet. The type of data packet may be determined from the body of the data packet or a specialized field in the data packet.

The controller 303 is configured to query the routing database based on the received packet listing the remote client device as a destination and forward the received packet to the policy server 100. The policy server 100 facilitates a secure session between the network device 300 and the remote client device. The secure session may be an IPsec session. The controller 303 may also drop the received packet in response to the destination being associated with the policy server 100 in the routing database.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium (e.g., memory 301 or database 307), the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. A method comprising:
  establishing a security protocol channel between a policy server and a first client device in a group of client devices;
  receiving a registration request including a first security configuration for the first client device, wherein the first security configuration includes a plurality of security levels including a low level for the client device of the group of client devices and a first communication type and a high level for the client device of the group of client devices and a second communication type;
  generating a security policy based on the first security configuration and a second security configuration;

updating a client database according to the security configuration including the plurality of security levels associated with the client device; and
generating a routing message for the first client device, wherein the routing message defines routing for communication from the first client device to a second client device using the low level for the first communication type,
wherein the routing message is configured to update a routing table of the first client device with an address of the policy server as a next hop for communication to the second client device.

2. The method of claim 1, further comprising:
receiving a policy request from the first client device, wherein the policy request specifies the second client device; and
accessing the client database based on the policy request.

3. The method of claim 2, further comprising:
in response to the policy request from the first client device, pushing the security policy to the first client device and the second client device.

4. A method comprising:
establishing a security protocol channel between a policy server and a first client device;
receiving a registration request including a first security configuration for the first client device, wherein the first security configuration includes a plurality of security levels including a first security level for a first communication type and a second security level for a second communication type;
updating a client database according to the security configuration;
generating a routing message for the first client device, wherein the routing message is configured to update a routing table of the first client device with an address of the policy server as a next hop to a second client device;
generating a security policy based on a type of transmission described in the routing message and based on the first security configuration and a second security configuration for communication from the first client device to the second client device,
wherein the security policy includes a highest common security level from the plurality of security levels from the first client device and a security level of the second client device.

5. The method of claim 4, wherein the security policy includes data indicative of an encryption algorithm or a hash algorithm.

6. A method comprising:
establishing a security protocol channel with a policy server;
generating a registration request including a first security configuration for the first client device, wherein the first security configuration includes a plurality of security levels including a low level for the client device and a first transfer type for public communication and a high level for the client device and a second transfer type for private communication;
sending the registration request to the policy server, wherein the policy server generates a security policy based on the first security configuration and a second security configuration;
receiving a routing message from the policy server, wherein the routing message defines routing for communication from the first client device to a second client device using the high level for the second transfer type; and updating a routing table in response to the routing message with an address of the policy server as a next hop for communication to the second client device.

7. The method of claim 6, further comprising:
receiving a packet for protection under the first security configuration; and
querying the routing table for the destination address.

8. The method of claim 7, further comprising:
when the routing table specifies the next hop as the policy server for the packet for protection, sending a policy request to the policy server.

9. The method of claim 7, further comprising:
cloning a virtual access interface for secure communication under the security policy.

10. The method of claim 7, further comprising:
when the routing table specifies a next hop as the policy server for the packet for protection, dropping the packet for protection.

11. An apparatus comprising:
a processor; and
a memory comprising one or more instructions executable by the processor to perform:
establishing a security protocol channel between a policy server and a first client device;
receiving a registration request including a security configuration for the first client device, wherein the security configuration includes a first security level;
updating a client database according to the security configuration and the first security level, wherein the client database also includes a second security level for a second client device;
generating a security policy based on the first security level and the second security level; and
generating a routing message for the first client device, wherein the routing message defines routing for communication from the first client device to the second client device according to a highest common level between the first security level and the second security level,
wherein the routing message is configured to update a routing table of the first client device with an address of the policy server as a next hop for communication to the second client device.

12. An apparatus comprising:
a processor; and
a memory comprising one or more instructions executable by the processor to perform:
establishing a security protocol channel with a policy server;
generating a registration request including a first security configuration for the first client device, wherein the first security configuration includes a plurality of security levels including a first level for transaction, a second level for file transfer, and a third level for messaging;
sending the registration request to the policy server, wherein the policy server generates a security policy based on the first security configuration and a second security configuration;
receiving a routing message from the policy server, wherein the routing message defines routing for communication from the first client device to a second client device;
updating a routing table in response to the routing message;
receiving a packet for protection under the first security configuration;
querying the routing table for the destination address; and when the routing table specifies an address of the policy server as a next hop for the packet for protection, sending a policy request to the policy server.

13. The apparatus of claim 12, further comprising:
receiving an acknowledgement message from the policy server.

14. The apparatus of claim 13, further comprising:
cloning a virtual access interface for secure communication under the policy.

15. The apparatus of claim 12, further comprising:
when the routing table specifies a next hop as the policy server for the packet for protection, dropping the packet for protection.

* * * * *